United States Patent
Kivits

[11] Patent Number: 5,620,081
[45] Date of Patent: Apr. 15, 1997

[54] TURNOVER DEVICE FOR GRAPHIC PRODUCTS

[75] Inventor: Petrus F. Kivits, Em Schiedam, Netherlands

[73] Assignee: Buhrs-Zaandam B.V., Zaandam, Netherlands

[21] Appl. No.: 416,231

[22] Filed: Apr. 4, 1995

[30] Foreign Application Priority Data

Apr. 6, 1994 [NL] Netherlands .............. 9400542

[51] Int. Cl.⁶ ............................................. B65G 49/05
[52] U.S. Cl. .................. 198/404; 271/182; 271/187; 198/384; 198/412; 198/803.15; 198/689.1; 414/27
[58] Field of Search ....................... 198/404, 384, 198/373, 412, 803.15, 408, 633, 484.1, 689.1; 271/182, 315, 187; 414/27

[56] References Cited

U.S. PATENT DOCUMENTS

| | | |
|---|---|---|
| 2,565,779 | 8/1951 | Muddiman. |
| 2,833,099 | 5/1958 | Rejsa .................................. 198/404 X |
| 4,537,390 | 8/1985 | Kiamco et al. .................... 271/187 X |
| 4,600,186 | 7/1986 | von Hein et al. ...................... 271/182 |
| 5,083,768 | 1/1992 | Ertavi et al. ....................... 271/187 X |
| 5,249,791 | 10/1993 | Belanger et al. ....................... 271/182 |

FOREIGN PATENT DOCUMENTS

| | | |
|---|---|---|
| 2592015 | 6/1987 | France. |
| 3636149 | 4/1988 | Germany. |

*Primary Examiner*—Frank E. Werner
*Attorney, Agent, or Firm*—Griffin, Butler, Whisenhunt & Kurtossy

[57] ABSTRACT

A turnover device for turning over products (8), for instance graphic products, comprising a feed conveyor assembly (4) and a discharge conveyor assembly (6) each made up of a number of parallel conveyors arranged side by side with an interspace therebetween, a turnover rack (1) being arranged between the feed and discharge assemblies, which turnover rack comprises outwardly extending product carriers (2) movable through the interspace of the conveyors of the discharge conveyor assembly (6). Provided adjacent the discharge end of the feed conveyor assembly (4) are adjustable decelerating devices (5) for decelerating the products (8) to be turned over and the discharge conveyor assembly (6) comprises a driver (7) for accelerating the turned-over products (8').

10 Claims, 1 Drawing Sheet

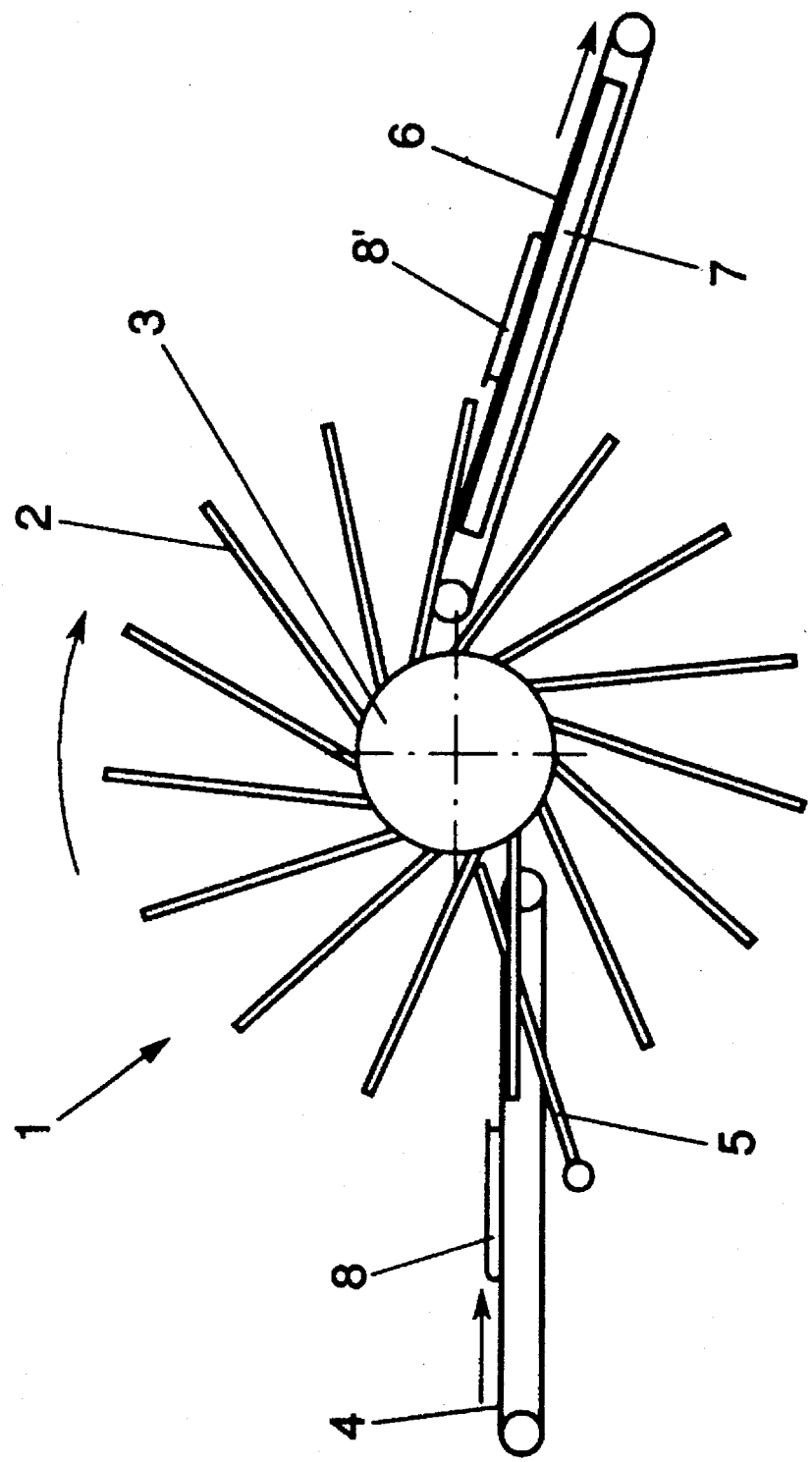

TURNOVER DEVICE FOR GRAPHIC PRODUCTS

This invention relates to a turnover device for turning over products, for instance graphic products, comprising a feed conveyor assembly and a discharge conveyor assembly each made up of a number of parallel conveyors arranged side by side with an interspace, a turnover rack being disposed between the feed and discharge assemblies, which turnover rack comprises outwardly extending product carriers movable through the interspace of the conveyors of the discharge conveyor assembly.

BACKGROUND OF THE INVENTION

Such a turnover device is known from U.S. Pat. No. 5,213,196. The turnover rack is formed by an endless conveyor belt traveling around two return pulleys and fitted with outwardly extending product carriers. This device is intended for turning over and simultaneously drying products. To that end, the conveyor belt is passed through a drying tunnel. For that reason, no requirements are set with regard to the processing speed of the products. In addition, this device need not satisfy any requirements regarding compact overall length. When this device is operated at a high speed, the products to be turned over come to a standstill against the conveyor belt of the turnover rack. As a result, in particular the leading end of the product to be turned over may be damaged. The processing speed of this device should therefore be low.

The object of the invention is to provide a compact turnover device, whereby the products are fed, turned over and discharged again at a high speed without thereby being damaged.

SUMMARY OF THE INVENTION

This object is achieved according to the invention in that adjacent the discharge end of the feed conveyor assembly, adjustable decelerating means are provided for decelerating the products to be turned over and the discharge conveyor assembly comprises driver means for accelerating the inverted products. As a result, the leading end of the products does not come into contact with the hub of the turnover rack. Owing to the decelerating means being provided adjacent the discharge end of the feed conveyors and owing to the feed conveyors continuing between the product carriers of the turnover rack, the overall length of the turnover device is shorter than that of the known turnover devices. Owing to the discharge conveyors being provided with driver means, the discharge speed of the inverted products can be accurately set and the inverted products can be brought to the high (feeding) speed again.

A further advantage according to the invention is achieved in that the decelerating means are formed by resilient pins whose angle to the feed conveyors is adjustable. As a result, thicker and/or heavier products can be adequately decelerated with the same decelerating means before being lifted and carried by the product carriers of the turnover rack.

Preferably, the turnover rack is formed by a number of discs mounted at a particular mutual distance on a drivable shaft and comprising, on the outer circumference thereof, outwardly extending round rods, a number of rods lying in a plane parallel to the centerline of the turnover rack together forming a product carrier. The rods are movable between the feed conveyors and the decelerating means, the rods passing the feed conveyors substantially parallel thereto. As a result, the products to be turned over are lifted substantially uniformly by the product carriers and supported throughout the length thereof.

According to a preferred embodiment, the resilient pins of the decelerating means continue between the discs of the turnover rack. This prevents any contact between the products to be turned over and the discs of the turnover rack.

The turnover rack further comprises angle-adjustable discharge conveyors which comprise driver means for the controlled acceleration of the turned-over products. To that end, the discharge conveyors comprise conveyor belts with openings and a vacuum device for applying suction to the turned-over products. Thus the discharge speed of turned-over products can be accurately set and ensured.

Preferably, the centerline of the turnover rack is higher than the top surface of the feed conveyors and the turnover rack can be swung upwards, so that the discharge conveyors are tiltable in line with the feed conveyors. If desired, the turnover rack can be swung clear, so that the products are not turned over but are conveyed further without being turned over.

The invention further relates to a method for turning over products, for instance graphic products. In this method the products to be turned over are fed to feed conveyors, decelerated by adjustable decelerating means, then picked up from below by product carriers and turned over, and finally are carried, accelerated and discharged by the discharge conveyors. By this method the products are picked up by the turnover rack, turned over and discharged without thereby being damaged.

BRIEF DESCRIPTION OF THE DRAWING

The turnover device according to the invention is further explained below on the basis of an exemplary embodiment shown in the drawing which is a side elevation of the exemplary embodiment.

DESCRIPTION OF PREFERRED EMBODIMENTS

The drawing diagrammatically shows a side elevation of an embodiment of a turnover device according to the invention. The turnover rack 1 is constituted by a number of discs 3 fitted with outwardly extending product carriers 2, e.g. rods. The turnover rack 1 is preceded by a number of feed conveyors 4 in parallel arrangement. The angle of these feed conveyors 4 to the horizontal plane is adjustable. Arranged between the feed conveyors 4 are adjustable decelerating means 5 for decelerating products 8 to be turned over. The products 8 are then lifted from the conveyors 4 by the product carriers 2 of the turnover rack 1. As a consequence, the leading end of the products 8 does not abut against the discs 3 of the turnover rack 1. The decelerating means 5 are formed by resilient pins whose angle to the feed conveyors 4 is adjustable. As a consequence, thicker and/or heavier products 8 can be adequately decelerated with the same decelerating means 5 before being picked up and carried by the product carriers 2 of the turnover rack 1.

Preferably, the turnover rack 1 is formed by a number of discs 3 which are mounted at a particular mutual distance on a drivable shaft and comprise on the circumference thereof outwardly extending round rods 2, a number of rods 2 that lie in a plane parallel to the centerline of the turnover rack 1 together forming a product carrier. The rods 2 are movable between the feed conveyors 4 and the decelerating means 5, the rods 2 passing the feed conveyors 4 substantially parallel thereto. As a result, the products 8 to be turned over are picked up substantially uniformly and are supported throughout the length thereof.

According to a preferred embodiment, the resilient pins of the decelerating means 5 continue between the discs 3 of the turnover rack 1. Thus any contact between the products 8 to be turned over and the discs 3 of the turnover rack 1 is prevented.

The turnover device further comprises angle-adjustable discharge conveyors 6 which comprise driver means 7 for the controlled acceleration of the turned-over products 8'. To that end, the discharge conveyors 6 comprise conveyor belts with openings under which is arranged the driver means 7 in the form of a vacuum device for applying suction to the turned-over products 8'. Thus the discharge speed of turned-over products 8' can be accurately set and ensured.

Preferably, the centerline of the turnover rack 1 is higher than the top surface of the feed conveyors 4 and the turnover rack 1 is adapted to be swung upwards, so that the discharge conveyors 6 are tiltable in line with the feed conveyors 4. Thus, if desired, the turnover rack 1 can be swung clear so that the products 8 are not turned over but are conveyed further without being turned over.

The invention further relates to a method for turning over products 8, for instance graphic products. In this method, the products 8 to be turned over are fed to feed conveyors 4, decelerated by adjustable decelerating means 5, then picked up from below by product carriers 2 and turned over, and are finally carried, accelerated and discharged by the discharge conveyors 6. By this method the products 8 are picked up by the turnover rack 1, turned over and discharged without thereby being damaged.

I claim:

1. In a turnover device for turning over products comprising a feed assembly (4) and a discharge assembly (6) each made up of a number of spaced apart parallel conveyors (4, 6) arranged side by side with an interspace therebetween, a turnover rack (1) being arranged between the feed and discharge assemblies, which turnover rack (1) comprises outwardly extending product carriers (2) movable through the interspace of the conveyors, the improvement wherein adjacent a discharge end of the feed assembly (4) an adjustable decelerating means (5) is provided for decelerating the products (8) to be turned over and the discharge assembly (6) has a driver means (7) for accelerating the turned-over products (8').

2. A turnover device according to claim 1, wherein the decelerating means (5) is formed by resilient pins where an angle of the pins to the feed conveyors (4) is adjustable.

3. A turnover device according to claim 1, wherein the turnover rack (1) is formed by a number of discs (3) which are spaced apart a particular mutual distance and mounted on a drivable shaft and comprise, on an outer circumference thereof, outwardly extending round rods lying in a plane parallel to a centerline of the turnover rack, which rods in combination form the product carrier (2).

4. A turnover device according to claim 3, wherein the rods (2) are movable between the feed conveyors (4) and decelerating means (5), the rods (2) passing the feed conveyors (4) at least substantially parallel thereto.

5. A turnover device according to claim 3, wherein the rods (2) are movable between the discharge conveyors, the rods (2) passing the discharge conveyors at least substantially parallel thereto.

6. A turnover device according to claim 1, wherein resilient pins of the decelerating means (5) extend between discs (3).

7. A turnover device according to claim 1, wherein the discharge conveyors (6) for the controlled acceleration of products (8') are angularly adjustable.

8. A turnover device according to claim 7, wherein the discharge conveyors (6) comprise conveyor belts with openings and a vacuum device (7) for applying suction to the turned-over products (8').

9. A turnover device according to claim 1 wherein a centerline of the turnover rack (1) is located higher than a top surface of the feed conveyors (4), and the turnover rack (1) is adapted to be swung upwards so that the discharge conveyors (6) are tiltable in line with the feed conveyors (4).

10. A turnover device according to claim 1, wherein the device is adapted to turn over graphic products.

* * * * *